United States Patent
Saito et al.

(10) Patent No.: US 7,487,164 B2
(45) Date of Patent: Feb. 3, 2009

(54) INFORMATION PROCESSING APPARATUS CAPABLE OF PROPERLY REFLECTING A CHANGE IN A USER'S PREFERENCE OR INTEREST

(75) Inventors: Mari Saito, Kanagawa (JP); Noriyuki Yamamoto, Kanagawa (JP); Mitsuhiro Miyazaki, Kanagawa (JP); Hiroyuki Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 10/841,547

(22) Filed: May 10, 2004

(65) Prior Publication Data

US 2005/0010951 A1 Jan. 13, 2005

(30) Foreign Application Priority Data

May 14, 2003 (JP) ............................. 2003-135900

(51) Int. Cl.
*G06F 7/00* (2006.01)
*G06F 17/30* (2006.01)
*G06F 15/173* (2006.01)

(52) U.S. Cl. .................... 707/100; 707/10; 707/101; 709/224

(58) Field of Classification Search ............... 707/10, 707/101, 102, 200, 201; 709/224; 703/27
See application file for complete search history.

(56) References Cited

U.S. PATENT DOCUMENTS

| 6,418,440 B1 * | 7/2002 | Kuo et al. ............... 707/10 |
| 6,981,040 B1 * | 12/2005 | Konig et al. ............ 709/224 |
| 2003/0135539 A1 | 7/2003 | Kondo et al. |

FOREIGN PATENT DOCUMENTS

| JP | 10-162027 | 6/1998 |
| JP | 11-66097 | 3/1999 |
| JP | 2001-14324 | 1/2001 |
| JP | 2001-34451 | 2/2001 |
| JP | 2001-155038 | 6/2001 |
| JP | 2002-14966 | 1/2002 |
| JP | 2002-63206 | 2/2002 |
| WO | WO 02/059785 A1 | 8/2002 |

* cited by examiner

*Primary Examiner*—Apu M Mofiz
*Assistant Examiner*—Chelcie Daye
(74) *Attorney, Agent, or Firm*—Oblon, Spivak, McClelland, Maier & Neustadt, P.C.

(57) ABSTRACT

The present invention is intended to properly reflect the change in user's preference and properly infer the user's interest in newly added attributes, thereby realizing contents recommendation which is close to user's interest. A topic selection block deliberately selects the interest data which is low in the degree of importance and a dialogue generation block generates queries. A response input block accepts a response to a query displayed by a dialogue display block and changes the interest data in accordance with the contents of the accepted response. The present invention is applicable to personal computers or HDD recorders.

13 Claims, 16 Drawing Sheets

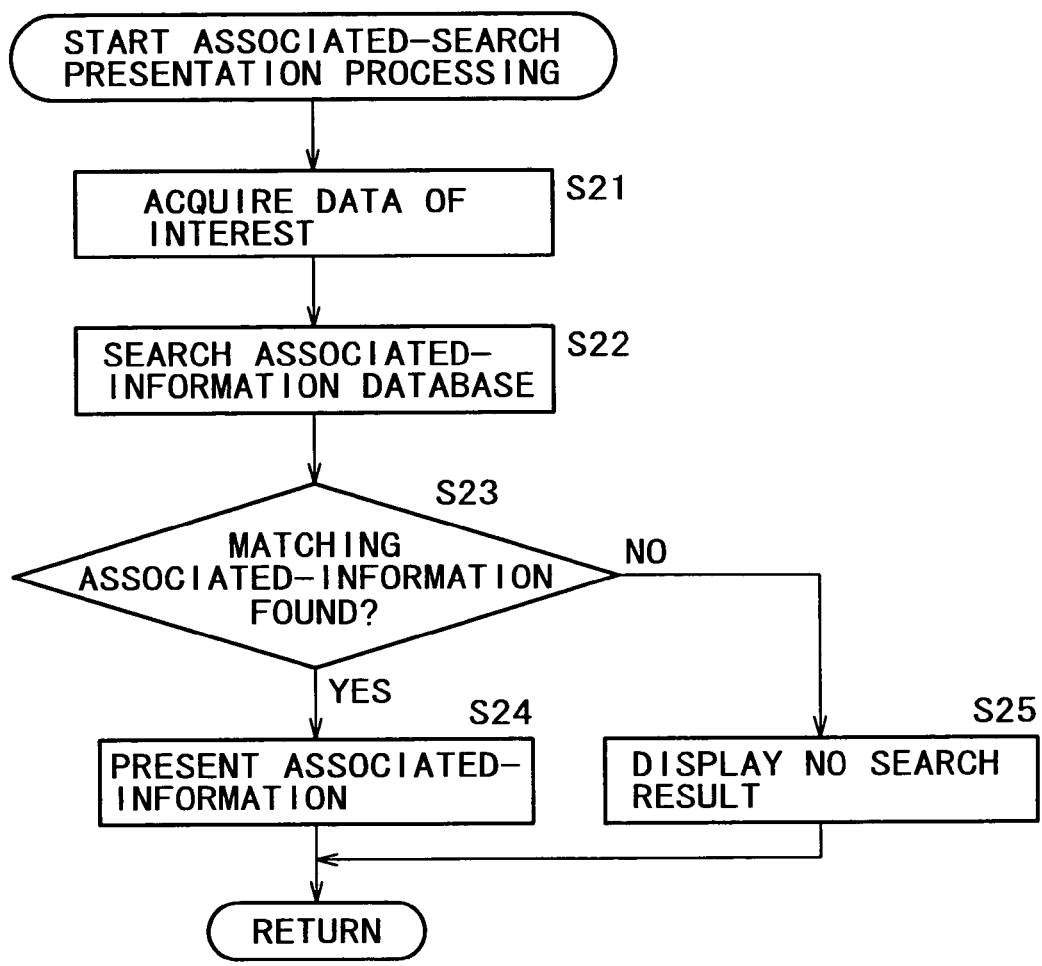
F I G. 7

FIG. 10

|   | GENRE | IMPORTANCE |
|---|---|---|
| 1 | NEWS | 11 |
| 2 | SPORTS | 9 |
| 3 | DOCUMENTARY | 4 |
| 4 | DRAMA | 3 |
| 5 | VARIETY | 2 |
| ⋮ | ⋮ | ⋮ |

FIG. 11

| | PERSONALITY | IMPORTANCE |
|---|---|---|
| 1 | A | 17 |
| 2 | B | 15 |
| 3 | C | 10 |
| 4 | D | 8 |
| 5 | E | 5 |
| ⋮ | ⋮ | ⋮ |

141-3

141-2

141-1

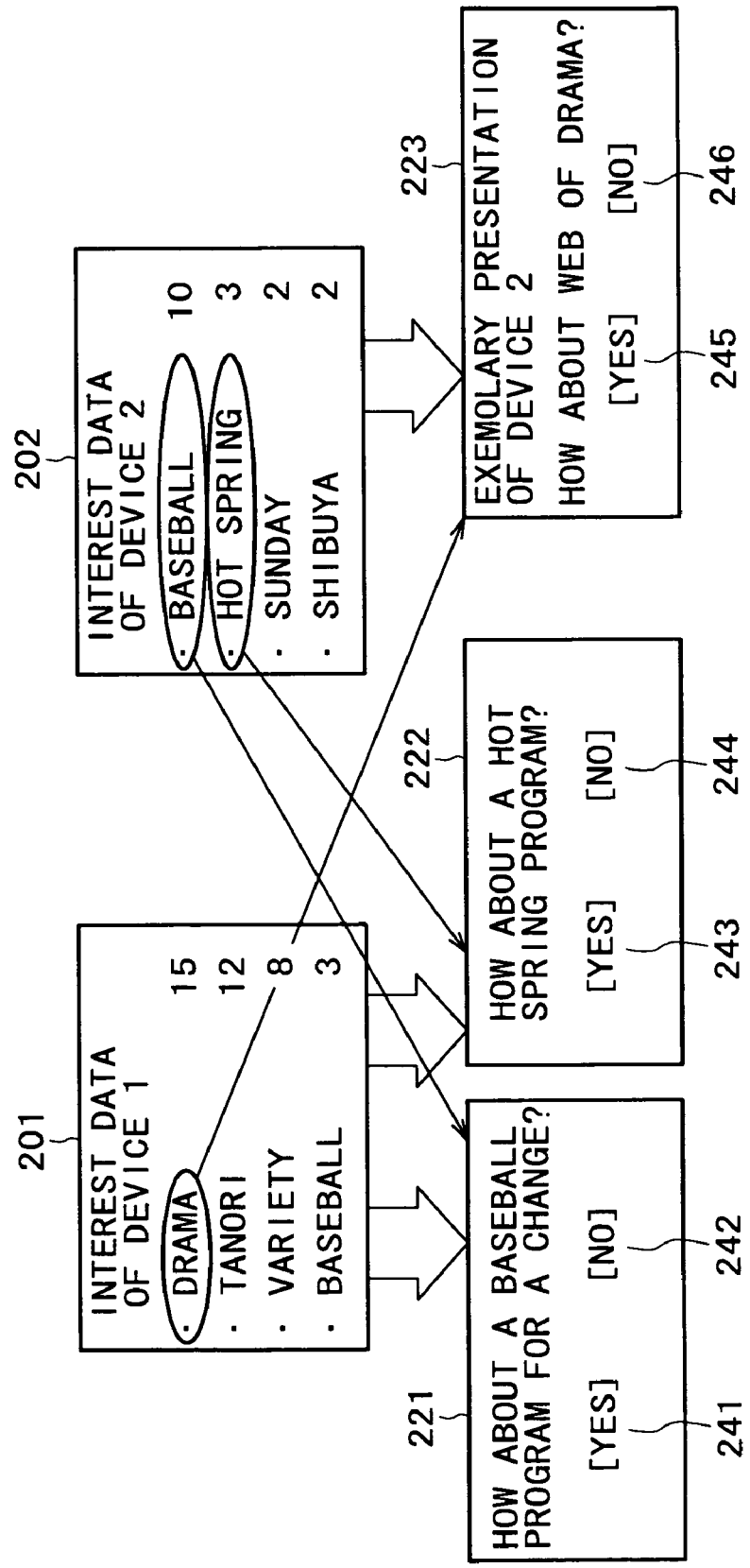

FIG. 15A

| INTEREST DATA OF DEVICE 1 | |
|---|---|
| · DRAMA | 15 |
| · TANORI | 12 |
| · VARIETY | 8 |
| · BASEBALL | 13 |

FIG. 15B

| INTEREST DATA OF DEVICE 1 | |
|---|---|
| · DRAMA | 15 |
| · TANORI | 12 |
| · VARIETY | 8 |
| · BASEBALL | 0 |

FIG. 16

| INTEREST DATA OF DEVICE 1 | |
|---|---|
| · DRAMA | 15 |
| · TANORI | 12 |
| · VARIETY | 8 |
| · BASEBALL | 3 |
| · HOT SPRING | 3 |

INFORMATION PROCESSING APPARATUS CAPABLE OF PROPERLY REFLECTING A CHANGE IN A USER'S PREFERENCE OR INTEREST

BACKGROUND OF THE INVENTION

The present invention relates to an information processing apparatus and method, a program, and a recording medium. More particularly, the present invention relates to an information processing apparatus and method, a program, and a recording medium which properly reflect the change in user's preference and properly infer user's interest in newly added attributes, thereby recommending contents which is closer to user's interest.

As methods for recommending television programs (or contents), the initial interest registering, the viewing log utilizing, and the coordination filtering are known, for example.

In any of these schemes, an electronic program guide (EPG) and program information (or program metadata) on the Web are used for the original data. These three schemes depend on how to acquire user's preferential data to be matched with these pieces of information.

In the initial interest registering, at the starting of use, the user registers his/her favorite categories (drama, variety, etc.), favorite genre name (drama, music, etc.), and favorite television personalities, for example. Subsequently, matching is made with program metadata with the registered information used as keywords, thereby getting program names to be recommended.

In the viewing log utilizing, every time the user views a program, the program metadata associated with the viewed program is accumulated and, when the viewing log (or program metadata) is accumulated to a predetermined amount, this viewing log is analyzed to get program names to be recommended. Alternatively, instead of the viewing log, an operation log such as the preset recording or the start of recording done by the user may be used on devices in which recording is made on a hard disk drive, for example. In this case, the information, which highly reflects user's interest, can be obtained rather than vague information about programs.

In the coordination filtering, a matching is made between one user's viewing (or operation) log and another user's viewing log to acquire the viewing log of another user similar to the user concerned in viewing log. Then, program names which have not been viewed by the user concerned are obtained from among the programs viewed by another user similar (in favorite) to the user concerned in viewing log, thereby recommending the obtained program names not viewed by the user concerned.

By using the above-mentioned program recommendation schemes, it becomes possible to allow the recommendation of the programs in which the user is interested.

However, these program recommendation schemes present problems that the interest of user is extracted from program (contents) metadata (namely, a biased interest in television programs is obtained) and, because generally popular names are used owning to the structure of program metadata, similar contents tend to be recommended.

To overcome these problems, the applicant hereof proposed a technology for letting users evaluate how much they are interested in particular contents recommended for them and searching for particular contents on the basis of the results of the evaluation, thereby making recommendations (refer to Patent Document 1, for example).

[Patent document 1]

Japanese Patent Laid-open No. 2002-63206

However, the related-art technologies presuppose the recommendations on the basis of the initially registered data and the user information such as contents viewing log, so that it is difficult to reflect the change in user preference and infer the user's interest in newly added genre, for example.

SUMMARY OF THE INVENTION

It is therefore an object of the present invention to provide an information processing apparatus and method, a program and a recording medium which are capable of properly reflect the change in user's preference and properly infer the user's interest in newly added attributes (for example, newly added genre), thereby recommending programs (or contents) which is close to user's interest.

In carrying out the invention and according to one aspect thereof, there is provided an information processing apparatus, including: extraction means for extracting interest data indicative of user's interest; selection means for selecting interest data having a degree of importance lower than a predetermined threshold from among the interest data extracted by the extraction means; presentation means for presenting the interest data selected by the selection means; dialogue means for holding a dialogue with a user on the basis of the interest data presented by the presentation means; and update means for updating the interest data on the basis of a result of the dialogue executed by the dialogue means.

In the above-mentioned information processing apparatus, the dialogue means includes: generation means for generating a query on the basis of a model of dialogue; and response input means for inputting a user response for the presented query generated by the generation means and presented to the user; the extraction means can change the interest data extracted on the basis of the response inputted by the response input means.

The above-mentioned information processing apparatus further including: database production means for producing a database of associated information about contents to be recommended to the user by obtaining metadata of the contents; wherein the selection means can select the interest data from the database of the associated information.

In the above-mentioned information processing apparatus, the generation means can select the model of dialogue in accordance with a characteristic of the information processing apparatus.

In the above-mentioned information processing apparatus, the extraction means can extract interest data of another information processing apparatus and the selection means can select the interest data from among the interest data of another information processing apparatus extracted by the extraction means.

In the above-mentioned information processing apparatus, the interest data have a plurality of attributes and the extraction means can extract the interest data on the basis of a degree of importance of each of the plurality of attributes.

In the above-mentioned information processing apparatus, the update means can add a predetermined value to or subtract a predetermined value from the degree of importance on the basis of a result of dialogue executed by the dialogue means.

In the above-mentioned information processing apparatus, the update means can change an order of the degree of importance on the basis of a result of dialogue executed by the dialogue means.

In the above-mentioned information processing apparatus, the update means can delete or add the interest data on the basis of a result of dialogue executed by the dialogue means.

In the above-mentioned information processing apparatus, the update means can execute addition or subtraction between the degree of importance and a degree of importance of the interest data extracted from the another information processing apparatus on the basis of a result of dialogue executed by the dialogue means.

In carrying out the invention and according to another aspect thereof, there is provided an information processing method including the steps of: extracting interest data indicative of user's interest; selecting interest data having a degree of importance lower than a predetermined threshold from among the interest data extracted by the extraction step; presenting the interest data selected by the selection step; holding a dialogue with a user on the basis of the interest data presented by the presentation step; and updating the interest data on the basis of a result of the dialogue executed by the dialogue step.

In carrying out the invention and according to still another aspect thereof, there is provided a program for making a computer execute the steps of: controlling extraction of interest data indicative of user's interest; controlling selection so as to select interest data having a degree of importance lower than a predetermined threshold from among the interest data extracted by the extraction controlling step; controlling presentation of the interest data selected by the selection controlling step; controlling dialogue so as to hold a dialogue with a user on the basis of the interest data presented by the presentation controlling step; and controlling updating the interest data on the basis of a result of the dialogue executed by the dialogue step.

In carrying out the invention and according to yet another aspect thereof, there is provided a recording medium recording a program for making a computer execute the steps of: controlling extraction of interest data indicative of user's interest; controlling selection so as to select interest data having a degree of importance lower than a predetermined threshold from among the interest data extracted by the extraction controlling step; controlling presentation of the interest data selected by the selection controlling step; controlling dialogue so as to hold a dialogue with a user on the basis of the interest data presented by the presentation controlling step; and controlling updating the interest data on the basis of a result of the dialogue executed by the dialogue step.

In the information processing apparatus and method, and program according to the invention, interest data indicative of user's interest is extracted, the interest data having a degree of importance lower than a predetermined threshold is selected from among the extracted interest data, the selected interest data is presented, dialogue with a user is executed on the basis of the presented interest data, and the interest data is updated on the basis of a result of the dialogue.

BRIEF DESCRIPTION OF THE DRAWINGS

These and other objects of the invention will be seen by reference to the description, taken in connection with the accompanying drawing, in which:

FIG. 7 is a flowchart describing associated-information search processing;

FIG. 10 shows an exemplary configuration of interest data;

FIG. 11 shows an exemplary configuration of attributes of interest data shown in FIG. 10;

FIG. 14 shows exemplary display screens of device 1 and device 2;

FIGS. 15A and 15B show exemplary configurations of interest data of device 1; and FIG. 16 shows another exemplary configuration of interest data of device 1.

DETAILED DESCRIPTION OF PREFERRED EMBODIMENTS

Figure 1:
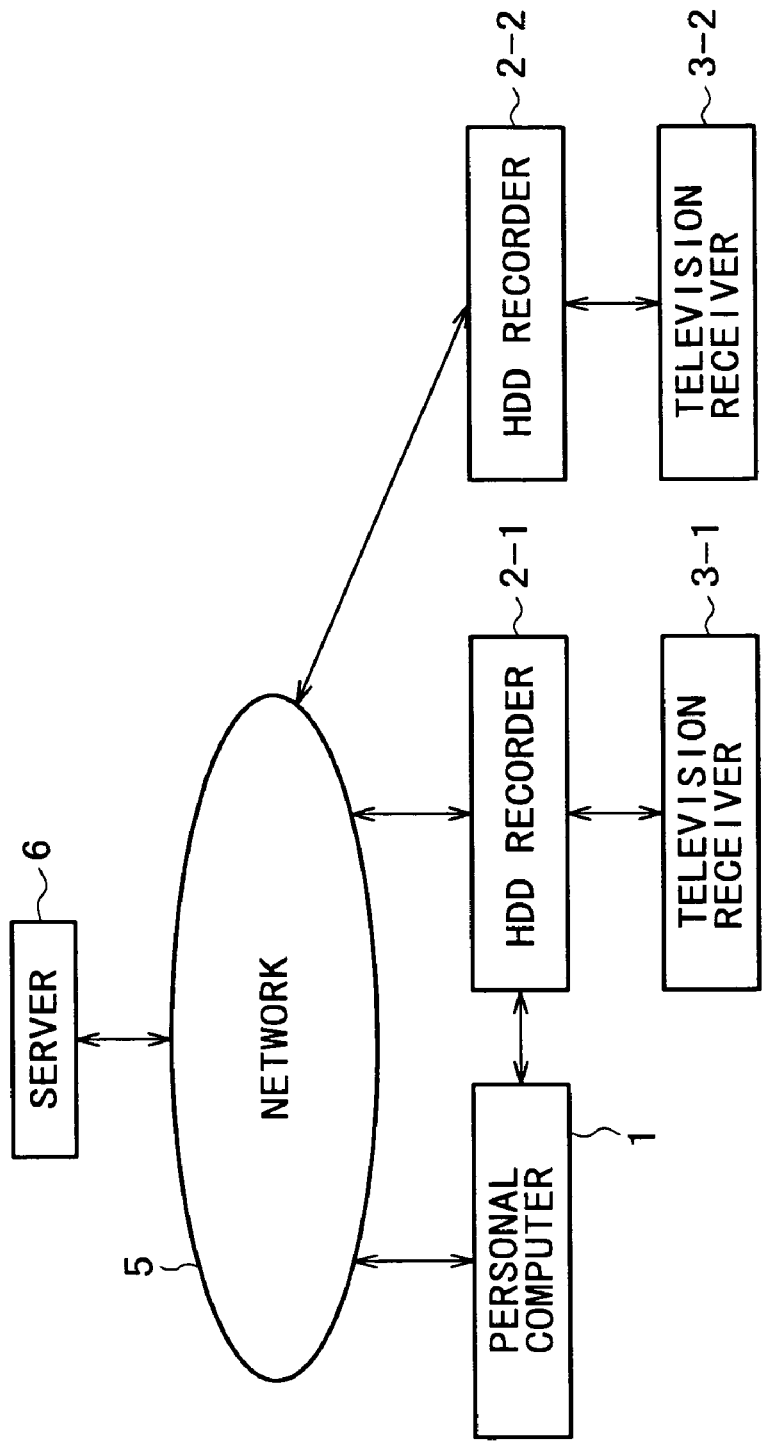
FIG. 1 is an exemplary configuration of a contents search system practiced as one embodiment of the invention.

The present invention will be described in further detail by way of example with reference to the accompanying drawings. The correlation between the components of the claims herein and the particular examples in an embodiment of the invention is as follows. This description is intended to make sure that the particular examples supporting the invention written in the claims herein are written in an embodiment of the invention. Therefore, if there is a particular example which is described an embodiment of the invention but not described in the preferred embodiments here as one that corresponds to a component of the embodiment, it does not denote that this particular example does not correspond to that component. Conversely, if a particular example is described in the preferred embodiments here as corresponding to a component of an embodiment, it does not denote that this particular example does not correspond to any other components than that component.

Further, the above-mentioned description does not denote that the invention corresponding to a particular example described in the preferred embodiments here is written in all claims herein. In other words, the above-mentioned description is about the invention corresponding to a particular example described in the preferred embodiments herein and does not deny the existence of any invention that is not described in the claims herein, namely the existence of any invention that will be divisionally applied or added by amendment in the future.

The information processing apparatus recited in claim 1 herein including: extraction means (for example, an interest extraction block 102 shown in FIG. 4) for extracting interest data indicative of user's interest; selection means (for example, 1 topic selection block 124 shown in FIG. 5) for selecting interest data having a degree of importance lower than a predetermined threshold from among the interest data extracted by the extraction means; presentation means (for example, a dialogue display block 122 shown in FIG. 5) for presenting the interest data selected by the selection means; dialogue means (for example, a dialogue block 107 shown in FIG. 4) for holding a dialogue with a user on the basis of the interest data presented by the presentation means; and update means (for example, an interest extraction block 102 shown in FIG. 4 for executing the processing of step S43 shown in FIG. 8) for updating the interest data on the basis of a result of the dialogue executed by the dialogue means.

In the information processing apparatus recited in claim 2 herein, the dialogue means including: generation means (for example, a dialogue generation block 121 shown in FIG. 5) for generating a query on the basis of a model of dialogue; and response input means (for example, a response input block 123 shown in FIG. 5) for inputting a user response for the presented query generated by the generation means and presented to the user; the extraction means changes the interest data extracted on the basis of the response inputted by the response input means.

Figure 4:
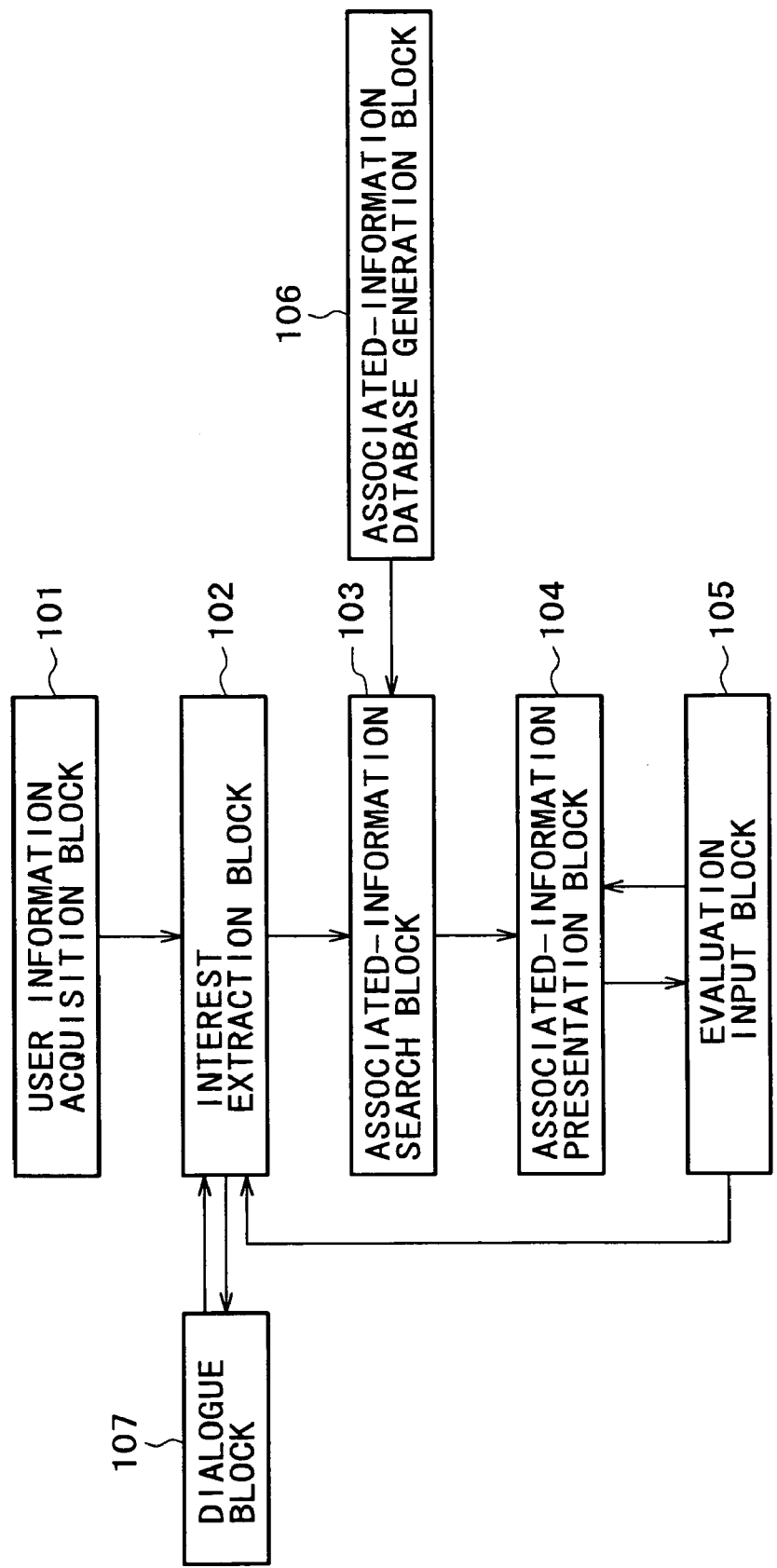
FIG. 4 is a block diagram illustrating an exemplary functional configuration of a CPU shown in FIG. 3.

The information processing apparatus recited in claim 3 herein further including: database production means (for example, a associated-information database generation block 106 shown in FIG. 4) for producing a database of associated information about contents to be recommended to the user by obtaining metadata of the contents; wherein the selection means selects the interest data from the database of the associated information.

Figure 8:
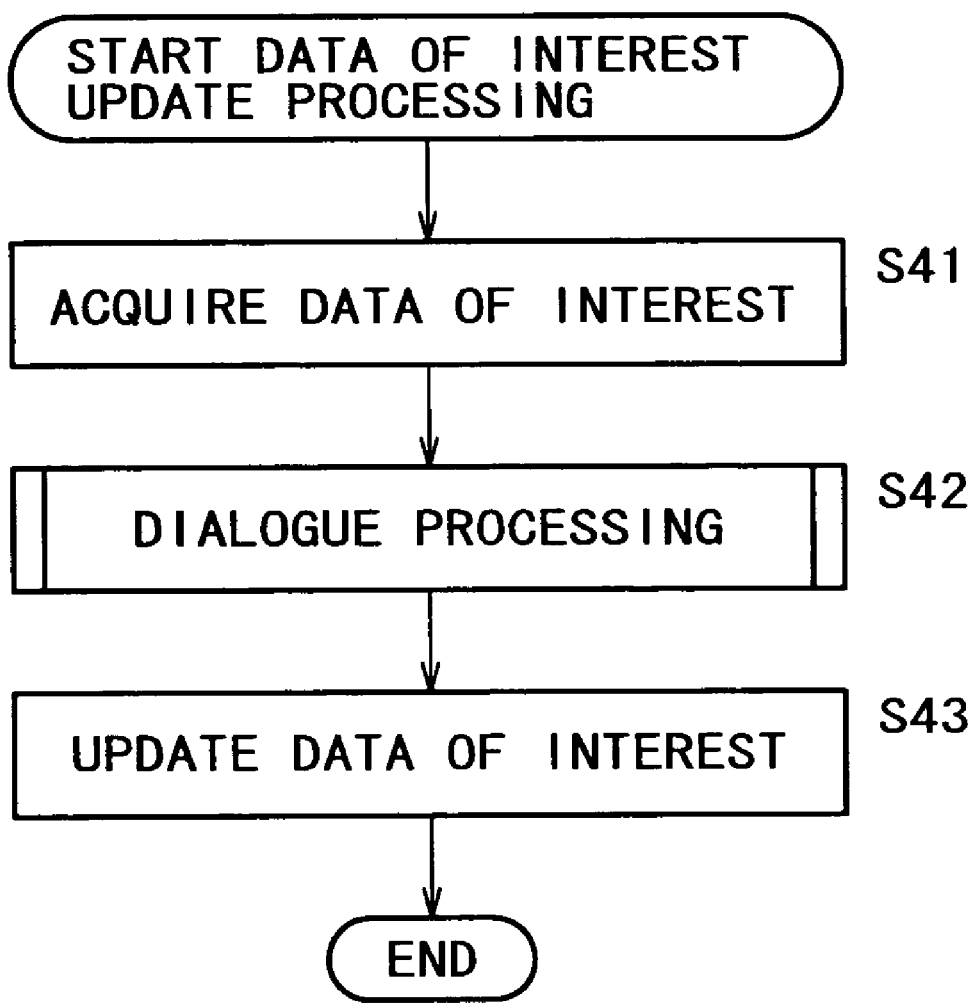
FIG. 8 is a flowchart describing interest data update processing.

The information processing method recited in claim 11 herein including the steps of: extracting interest data indicative of user's interest (for example, step S41 shown in FIG. 8); selecting interest data having a degree of importance lower than a predetermined threshold from among the interest data extracted by the extraction step (for example, step S51 shown in FIG. 9); presenting the interest data selected by the selection step (for example, step S42 shown in FIG. 8); holding a dialogue with a user on the basis of the interest data presented by the presentation step (for example, step S53 shown in FIG. 9); and updating the interest data on the basis of a result of the dialogue executed by the dialogue step (for example, step S43 shown in FIG. 8).

The program recited in claim 12 herein makes a computer execute the steps of: controlling extraction of interest data indicative of user's interest (for example, step S41 shown in FIG. 8); controlling selection so as to select interest data having a degree of importance lower than a predetermined threshold from among the interest data extracted by the extraction controlling step (for example, step S51 shown in FIG. 9); controlling presentation of the interest data selected by the selection controlling step (for example, step S42 shown in FIG. 8); controlling dialogue so as to hold a dialogue with a user on the basis of the interest data presented by the presentation controlling step (for example, step S53 shown in FIG. 9); and controlling updating the interest data on the basis of a result of the dialogue executed by the dialogue step (for example, step S43 shown in FIG. 8).

The recording medium recited in claim 13 herein records a program for making a computer execute the steps of: controlling extraction of interest data indicative of user's interest (for example, step S41 shown in FIG. 8); controlling selection so as to select of interest data having a degree of importance lower than a predetermined threshold from among the interest data extracted by the extraction controlling step (for example, step S51 shown in FIG. 9); controlling presentation of the interest data selected by the selection controlling step (for example, step S42 shown in FIG. 8); controlling dialogue so as to hold a dialogue with a user on the basis of the interest data presented by the presentation controlling step (for example, step S53 shown in FIG. 9); and controlling updating the interest data on the basis of a result of the dialogue executed by the dialogue step (for example, step S43 shown in FIG. 8).

The following describes embodiments of the invention. Referring to FIG. 1, there is shown an exemplary configuration of an information processing apparatus to which the present invention is applied. In this exemplary configuration, a personal computer 1 which functions as a user terminal and hard disk drive (HDD) recorders 2-1 and 2-2 (these may be hereafter generically referred to as a HDD recorder 2 unless it is necessary to make distinction between the two) are connected to a network 5. A server 6 which records interest data providing user's preference information and program metadata is also connected to the network 5. The personal computer 1 is connected via the HDD recorders 2-1 and 2-2 via Ethernet (trademark), for example. Television receivers 3-1 and 3-2 (these may be hereafter generically referred to as a television receiver 3 unless it is necessary to make distinction between the two) are connected to the HDD recorder 2-1 and the HDD recorder 2-2, respectively.

The information processing apparatus according to the invention may be configured by the personal computer 1 or may be configured by the HDD recorder 2-1 or the HDD recorder 2-2. Alternatively, the information processing apparatus according to the invention may be configured by the server 6.

The personal computer 1, the HDD recorders 2-1 and 2-2, and the television receivers 3-1 and 3-2 are owned by one user (or one family) and are arranged in proximity with each other. The network 5 may be either a LAN (Local Area Network) or a wide area network such as the Internet.

The personal computer 1 is an information processing apparatus which can execute a variety of application programs; for example, the personal computer 1 executes the transmission and reception of electronic mail, the browsing of Web pages, and the creation of documents. Also, the personal computer 1 extracts user's interests based on documents obtained by transmission and reception of electronic mail or browsed Web pages, thereby generating a database which contains interest data.

The HDD recorder 2 records television programs on a high-capacity hard disk drive and outputs recorded television programs to the television receiver 3 as specified by the user for reproduction. Also, the HDD recorder 2 acquires interest data to recommend, for the user, programs which match the interest data as will be described later with reference to FIG. 6.

The server 6 integrates the user's interest data generated by the personal computer 1 or the HDD recorder 2 and stores the integrated user's interest data.

Figure 2:
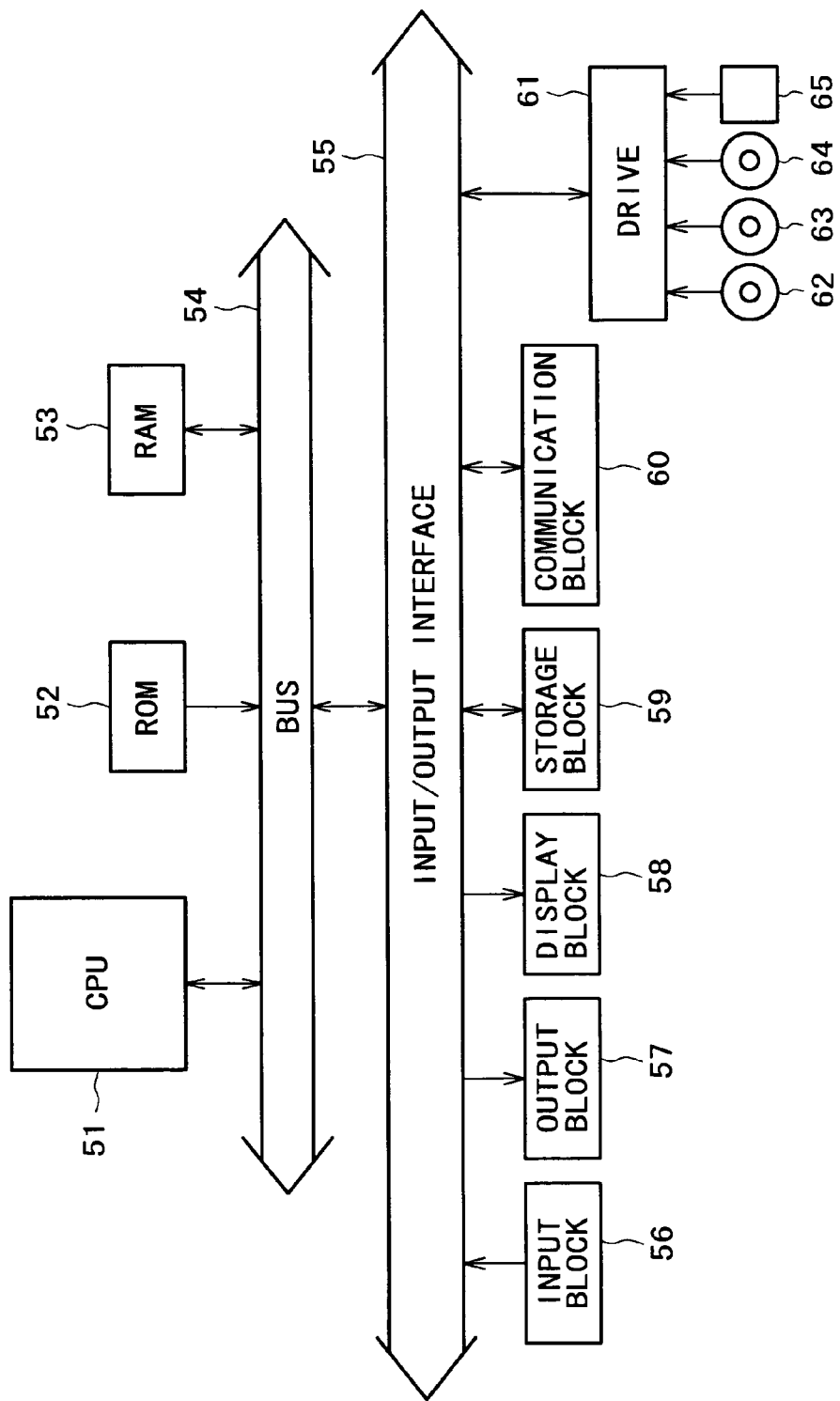
FIG. 2 is a block diagram illustrating an exemplary configuration of a personal computer shown in FIG. 1.

Referring to FIG. 2, there is shown a block diagram illustrating an exemplary configuration of the personal computer 1. It should be noted that this configuration is also applicable to the server 6.

The personal computer 1 incorporates a CPU (Central Processing Unit) 51. An input/output interface 55 is connected to the CPU 51 via a bus 54. The input/output interface 55 is connected to an input block 56 based on input devices such as a keyboard and a mouse, an output block 57 for outputting a processing result such as an audio signal, for example, a display block 58 based on a display monitor for displaying an image as a result of processing, a storage block 59 based on a hard disk drive for storing programs and built databases, a communication block 60 based on a LAN (Local Area Network) card for communicating data via a network represented by the Internet, and a drive 61 for reading/writing data on recording media such as a magnetic disk 62, an optical disk 63, a magneto-optical disk 64, or a semiconductor memory 65. The bus 54 is connected to a ROM (Read Only Memory) 52 and a RAM (Random Access Memory) 53.

Programs stored in the recording media, the magnetic disk 62 through the semiconductor memory 65, are read by the drive 61 or obtained by the communication block 60 via a network to be installed in a hard disk drive incorporated in the storage block 59. The programs stored in the storage block 59 are loaded from the storage block 59 into the RAM 53 for execution as instructed by the CPU 51 in accordance with user commands entered through the input block 56.

The hard disk drive incorporated in the storage block 59 also stores application programs such as a WWW (World Wide Web) browser which is loaded from the storage block 59 into the RAM 53 for execution as instructed by the CPU 51 in accordance with user commands entered through the input block 56.

Figure 3:
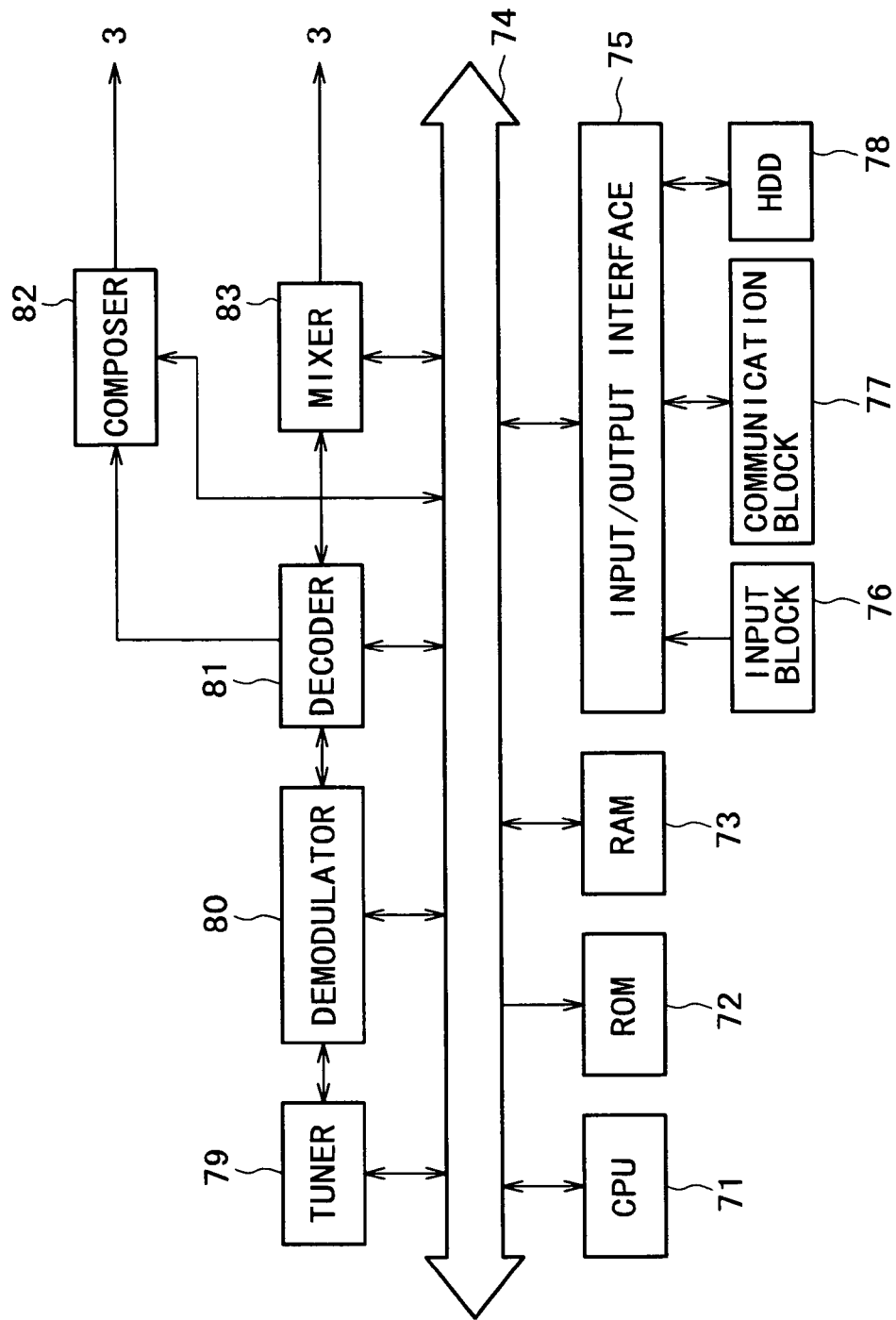
FIG. 3 is a block diagram illustrating an exemplary configuration of a HDD recorder shown in FIG. 1.

FIG. 3 is a block diagram illustrating an exemplary configuration of the HDD recorder 2-1 or 2-2. Because the HDD recorder 2-1 is the same as the HDD recorder 2-2 in configuration, they are generically called the HDD recorder 2 unless it is necessary to make distinction between them. Likewise, the television receiver 3-1 and the television receiver 3-2 are generically called the television receiver 3 unless it is necessary to make distinction between them. The HDD recorder 2 can record many pieces of video on a hard disk drive (HDD) 78 having a mass storage capacity and properly understand user intention to reflect the recording management (such as a viewing log and an operation log) of recorded video. It should be noted that the HDD recorder 2 may be mounted as an AV device; for example, the HDD recorder 2 may be integrated with a television receiver such as set-top box (STB).

A CPU 71 is a main controller for controlling the operation of the entire HDD recorder 2. To be more specific, on the basis of input signals supplied through an input block 76, the CPU 71 controls a tuner 79, a demodulator 80, a decoder 81, and the HDD 78, for example to execute program recording and reproduction. The CPU 71 also acquires interest data of the user to present program information (associated information).

A RAM 73 is a writable volatile memory in which an execution program of the CPU 71 is loaded and the data necessary for the execution program to run is stored. A ROM 72 is a read-only memory for storing a self-diagnosis and initialization program which is executed when the HDD recorder 2 is powered on and the control codes for operating the hardware, for example.

The input block 76 is constituted by a remote commander, buttons, switches, or a keyboard for example and outputs input signals generated in accordance with user operations to the CPU 71 via an input/output interface 75 and a bus 74.

A communication block 77 communicates with the server 6 and the personal computer 1 via the network 5. The data inputted in the communication block 77 is appropriately recorded to the HDD 78 via the input/output interface 75.

The HDD 78 is a random-accessible storage device which can store programs and data in a predetermined file format and has a huge storage capacity. The HDD 78 is connected to the bus 74 via the input/output interface 75, receives the data for data broadcasting such as broadcast programs and EPG data from the decoder 81 or the communication block 77, records the received information, and outputs the recorded data as required. Also, the HDD 78 stores the user's interest data generated in the CPU 71.

A broadcast wave received at an antenna, not shown, is supplied to the tuner 79. The broadcast wave is based on a predetermined format and includes EPG data, for example. The broadcast wave may be any of satellite broadcast wave, ground wave, wired wave, or wireless wave.

Under the control of the CPU 71, the tuner 79 tunes in on or selects the broadcast wave of a predetermined channel and outputs the received data to the demodulator 80. It should be noted that, depending on whether the broadcast wave received is analog or digital, the configuration of the tuner 79 may be changed or extended appropriately. The demodulator 80 demodulates the digitally modulated received data and outputs the resultant data to the decoder 81.

For example, in the case of digital satellite broadcasting, digital data received by the tuner 79 and demodulated by the demodulator 80 is a transport stream with AV data compressed by MPEG2 (Moving Picture Experts Group 2) and data for data broadcasting multiplexed. The AV data consist of video data and audio data which constitute the body of each broadcast program. The data for data broadcasting include the data (for example, EPG data) which accompany this broadcast program body.

The decoder 81 separates the transport stream supplied from the demodulator 80 into the AV data compressed by MPEG and the data for data broadcasting (for example, EPG data). The separated data for data broadcasting is supplied to the HDD 78 via the bus 74 and the input/output interface 75 and recorded to the HDD 78.

If an instruction is given to output the received program without change, the decoder 81 further separates the AV data into compressed video data and compressed audio data. The separated audio data is decoded and then outputted to a speaker of the television receiver 3 via a mixer 83. The separated video data is decompressed and then outputted to a monitor of he television receiver 3 via a composer 82.

If an instruction is given to record the received program to the HDD 78, the decoder 81 outputs the AV data before separation to the HDD 78 via the bus 74 and the input/output interface 75. If an instruction is given to reproduce a program recorded to the HDD 78, the decoder 81 receives the AV data from the HDD 78 via the input/output interface 75 and the bus 74, separates the received AV data into compressed video data and compressed audio data, and output the data to the composer 82 or the mixer 83, respectively.

The composer 82 composes the video data inputted from the decoder 81 with a GUI (Graphical User Interface) screen as required and outputs the composed data to the monitor of the television receiver 3.

Referring to FIG. 4, there is shown a block diagram illustrating an exemplary functional configuration of the CPU 51 shown in FIG. 2 or the CPU 71 shown in FIG. 3. In this example, a user information acquisition block 101 for acquiring user preference information from the initially registered information for example and an interest extraction block 102 for extracting interest data on the basis of the information acquired by the user information acquisition block 101 are provided. The extracted interest data is stored in the HDD drive, for example.

The interest data extracted by the interest extraction block 102 is transferred to an associated-information search block 103, which presents the associated information on the basis of the interest data. The associated information is composed of an electronic program guide (EPG) and program information stored on the Web, the program information to be broadcast, and the information about contents which is obtained via the network 5. An associated-information database generation block 106 acquires an EPG and the metadata of contents, classifies them as the associated information corresponding to predetermined interest data, and stores the resultant interest data in the HDD 78, for example.

The associated information retrieved by the associated-information search block 103 is outputted to the television receiver 3 for example by the associated-information presentation block 104. An evaluation input block 105 accepts the user evaluation of the presented associated information via the input block 76, for example. This user input is fed back to the interest extraction block 102 via the evaluation input block 105.

Figure 5:
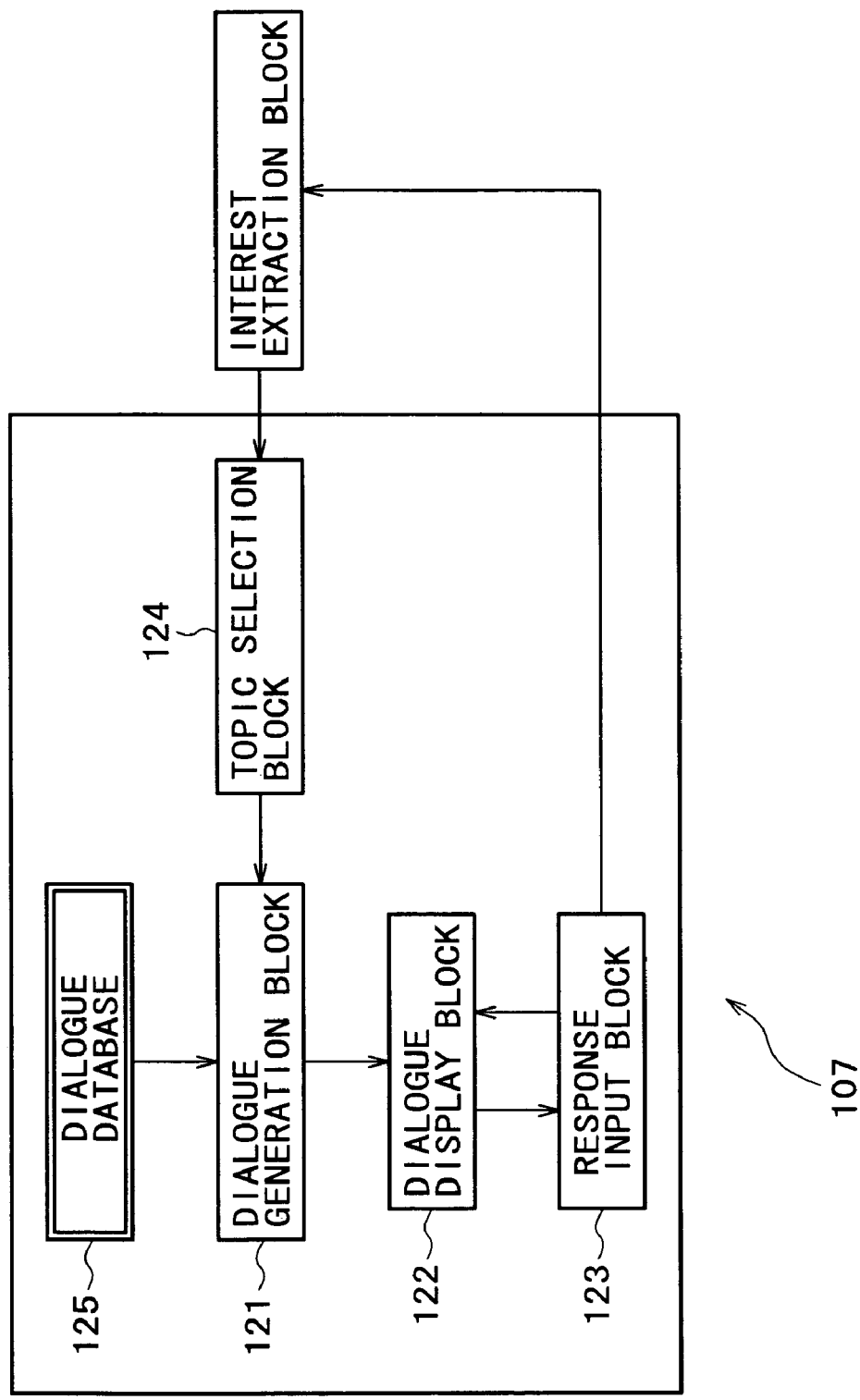
FIG. 5 is a block diagram illustrating an exemplary configuration of a dialogue block shown in FIG. 4.

A dialogue block 107 updates the interest data generated by the interest extraction block 102. FIG. 5 is an exemplary configuration of the dialogue block 107. A dialogue generation block 121 generates queries to the user on the basis of the interest data extracted from the topic selection block 124 and a dialogue model stored in a dialogue database 125. A dialogue display block 122 displays the queries generated by the dialogue generation block 121 onto the television receiver 3, for example. A response input block 123 accepts a user response to a displayed query via the input block 76, for example. The user response accepted by the response input block 123 is transferred to the interest extraction block 102, which updates the interest data.

Figure 6:
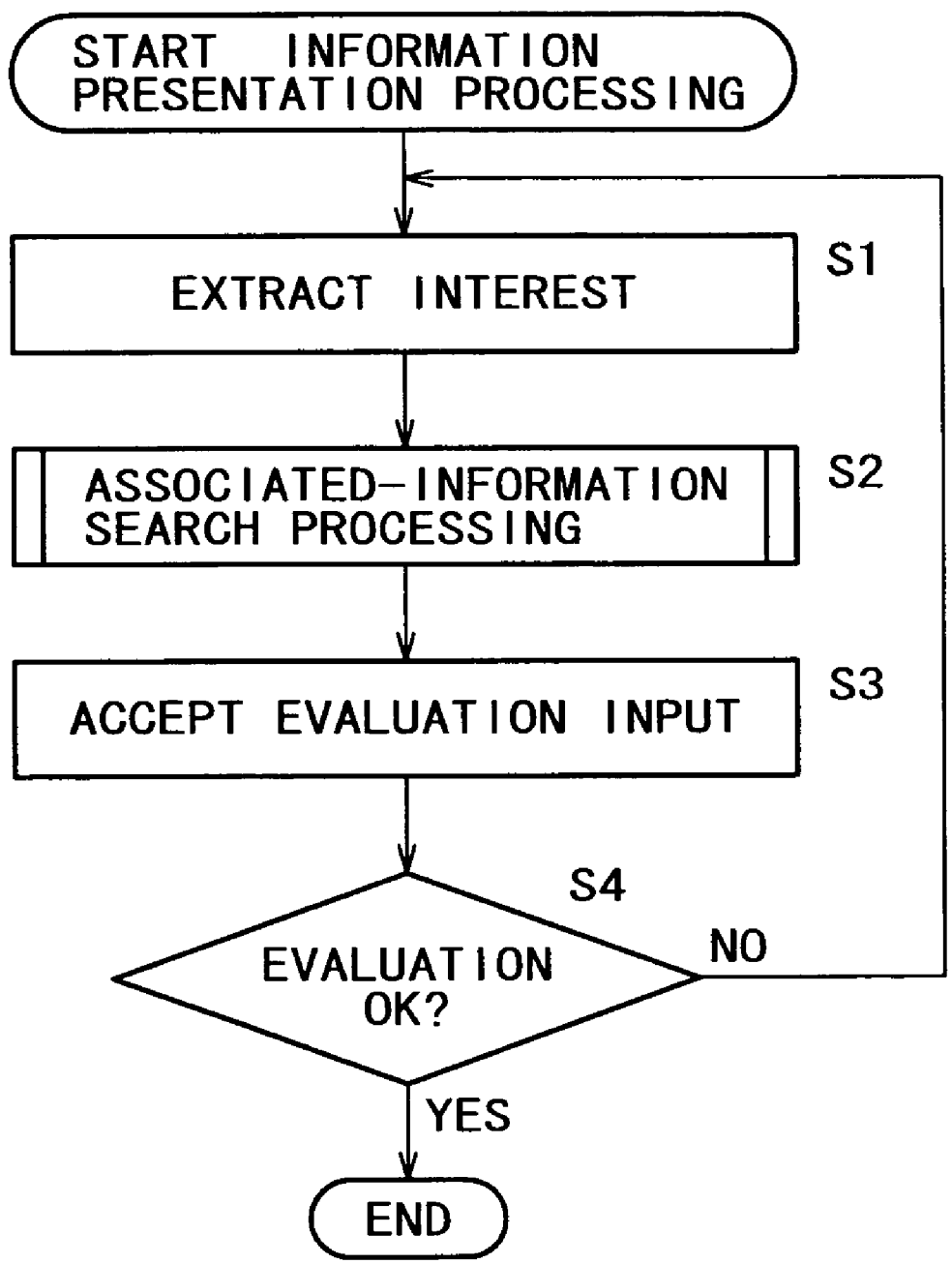
FIG. 6 is a flowchart describing information presentation processing.

The following describes the information presentation processing of the HDD recorder 2 with reference to FIG. 6. In step S1, the interest extraction block 102 extracts interest data which has already stored in the HDD 78. At this time, the data having the highest importance is extracted from among the initially registered interest data. The interest data is basically composed of attribute and importance degree. First, the default importance degree is used. As the dialogue with the user progresses, the importance degree is changed appropriately (refer to step S55 shown in FIG. 9 to be described later).

In step S2, the associated-information search block 103 executes the associated-information search processing to be described later with reference to FIG. 7. Consequently, the associated information corresponding to interest data is presented to the user. In step S3, the evaluation input block 105 accepts the user evaluation for the presented associated information. The evaluation is entered through the input block 76 by displaying the GUI for evaluation selection (for example, "OK" or "NG") for the associated information presented on the monitor of the television receiver 3.

In step S4, the evaluation input block 105 determines whether the user's evaluation is "OK" or not. If the evaluation is found not "OK", then the procedure returns to step S1, in which another interest data (for example, the interest data having the second degree of importance) are extracted and the above-mentioned processing is repeated. If the evaluation is found "OK" in step S4, the processing comes to an end.

As described above, the associated information is presented to the user for the recommendation of contents.

The following describes the associated-information search processing of step S2 shown in FIG. 6, with reference to FIG. 7. In step S21, the associated-information search block 103 acquires the interest data generated in step S1 by the interest extraction block 102. In step S22, the associated-information search block 103 searches the associated-information database for the associated information corresponding to the interest data. In step S23, the associated-information search block 103 determines whether there is matching information or not, namely, the associated information corresponding to the interest data have been retrieved or not.

If the matching information is found in step S43, then the procedure goes to step S24, in which the associated-information search block 103 outputs this associated information to the monitor of the television receiver 3 for presentation to the user. On the other hand, if the matching information is not found in step S23, then the procedure goes to step S25, in which the associated-information search block 103 outputs "Display No Search Result" to the monitor of the television receiver 3.

As described above, the associated information corresponding to the interest data is retrieved and presented to the user.

The above-mentioned interest data may be accumulated for each user or for each device. For example, if user A and user B are using the HDD recorder 2-1 and the HDD recorder 2-2 respectively, it is possible to generate a database of the interest data of user A in the HDD recorder 2-1, a database of the interest data of user B in HDD recorder 2-1, a database of the interest data of user A in the HDD recorder 2-2, and a database of the interest data of user B in the HDD recorder 2-2.

In the above-mentioned example, interest data is generated and accumulated in the HDD recorder 2; however, interest data may also be accumulated in other devices. For example, in the personal computer 1, interest data is generated on the basis of the contents of transferred electronic mail and the contents of browsed WWW pages for example and the interest data thus generated is accumulated.

In addition, it is practicable to send the interest data accumulated in one device (for example, the HDD recorder 2-1 or the HDD recorder 2-2) to another device (for example, the server 6) to accumulate plural pieces of interest data together or integrate different interest data.

The following describes the processing of updating interest data with reference to FIG. 8. This processing may be periodically executed at predetermine time intervals (for example, every week) or executed as instructed by the user.

In step S41, the interest extraction block 102 acquires the user's interest data accumulated in the HDD recorder 2 or the server 6. In step S42, the dialogue block 107 executes the dialogue processing to be described later with reference to FIG. 9. In step S43, the interest extraction block 102 updates the interest data on the basis of a result of the dialogue processing.

Figure 9:
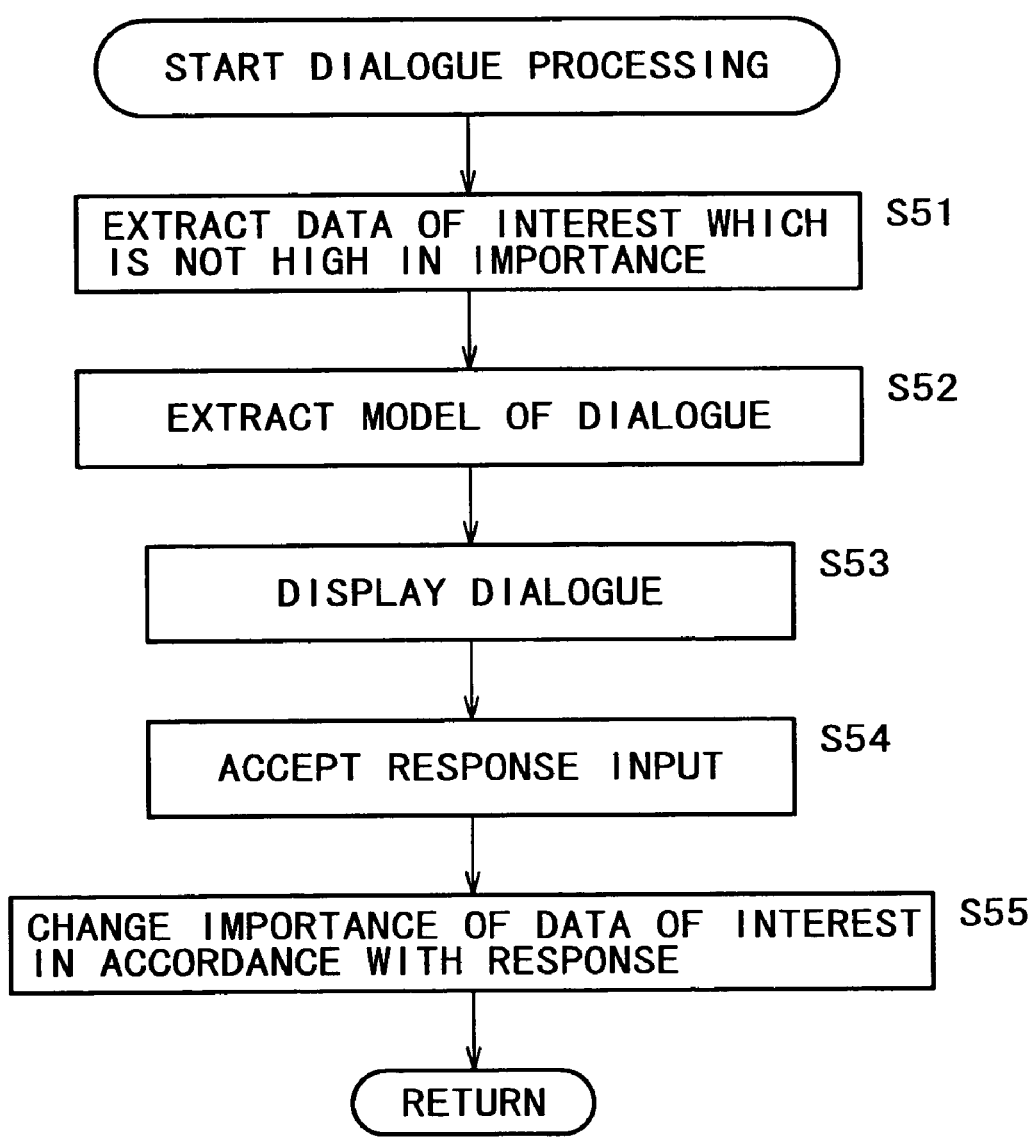
FIG. 9 is a flowchart describing dialogue processing.

The following describes the dialogue processing of step S42 shown in FIG. 8, with reference to FIG. 9. In step S51, the topic selection block 124 extracts the data which are not high (namely, low) in the degree of importance from among the interest data obtained by the processing of step S41.

FIG. 10 is an exemplary configuration indicating the interest data of one user (for example, user A). The interest data is classified as attribute "Genre" which is divided into "News", "Sports", "Documentary", "Drama", "Variety", and so on.

Each genre is attached with the degree of importance. The degree of importance is obtained by numerically expressing a frequency at which particular interest data are extracted, for example. As described with reference to FIG. 6, contents recommendation is made normally on the basis of the interest data having a high degree of importance. In this example, the degree of importance of "News" is 11, the degree of importance of "Sports" is 9, the degree of importance of "Documentary" is 4, the degree of importance of "Drama" is 3, and the degree of importance of "Variety" is 2.

In step S51, the interest data not high in the degree of importance, the interest data nearest to the threshold which supposed to be 5 (in this example, "Documentary") for example, is extracted. At this time, all interest data below the threshold may be extracted or the interest data having the lowest degree of importance may be extracted.

In step S52, the dialogue generation block 121 acquires the model of dialogue from the dialogue database 125. The dialogue database 125 stores the model for generating queries to be displayed to the user. The dialogue generation block 121 generates queries by imbedding a part or all of the interest data extracted in step S51.

In step S53, the dialogue generation block 121 makes the dialogue display block 122 display dialogue queries. At this time, a query constituting character string such as "How about a documentary program for a change?" is displayed on the monitor of the television receiver 3. It is also practicable to display some character and make it speak queries. It is further practicable to change models of dialogue which are obtained in step S52, thereby displaying queries such as "Do you want to browse contents about "Documentary"?", for example.

In step S54, the response input block 123 accepts the user response made for the query displayed in step S53. The response is entered by operating the input block 76 by the user on the GUI for choosing a response (for example, "YES" or "NO") displayed on the monitor of the television receiver 3, for example. It is also practicable to enter a response by operating the input block 76 by the user to enter a character string. In this case, the response input block 123 analyzes the entered character string to determine whether its contents denote affirmation or negation.

In step S55, the response input block 123 makes the interest extraction block 102 change the degree of importance of the interest data. For example, if "YES" is entered as the user response in step S54, a predetermined value (for example, 3) is added to the degree of importance of "Documentary" shown in FIG. 10 to change the degree of importance of "Documentary" to 7. If "NO" is entered in step S44 as the user response, a predetermined value (for example, 3) is subtracted from the degree of importance of "Documentary" shown in FIG. 10 to change the degree of importance of "Documentary" to 1.

In the above example, a predetermined value is added to the degree of importance of "Documentary" if "YES" (affirmation) is entered as the user response and a predetermined value is subtracted from the degree of importance of "Documentary" if "NO" (negation) is entered as the user response. It is also practicable, if affirmation is entered as the user response, to raise the order of "Documentary" by a predetermined number (for example, 1); if "NO" (negation) is entered as the user response, the order of "Documentary" is lowered by 1. In this case, the order of "Documentary" is raised from the third position to the second position or lowered from the third position to the fourth position.

Thus, the interest data is updated. If the user's preference is changed by making an enquiry about interest data not high in the degree of importance to reflect the response to that query, the degree of importance of the interest data may be properly modified. Further, if a new genre is added, the user's interest in that genre may be inferred.

Figure 11:
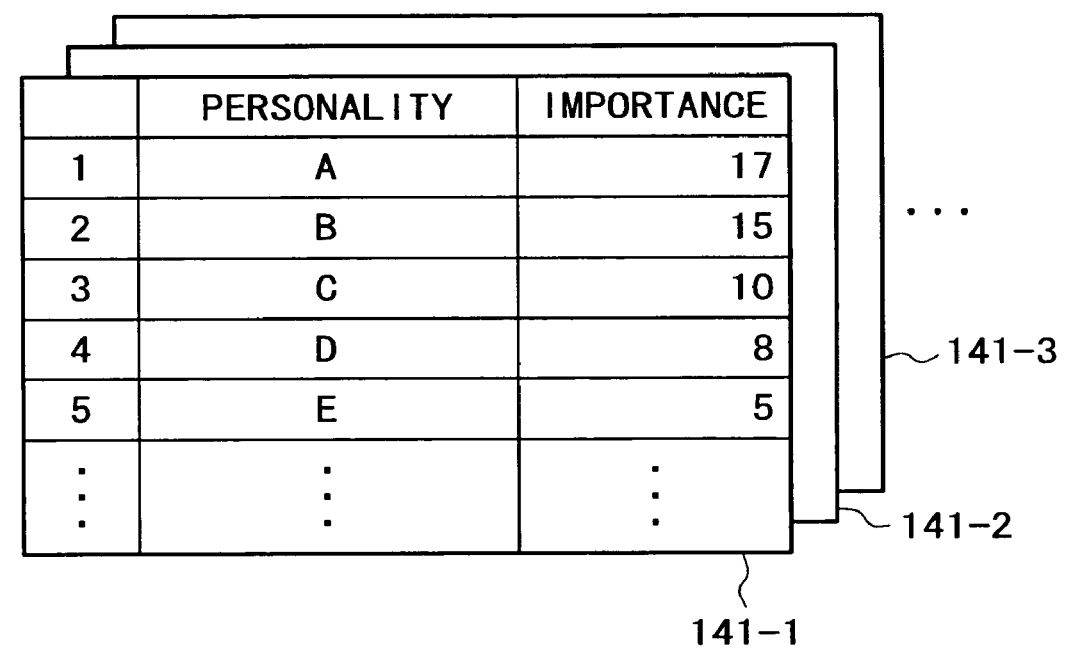

Interest data is classified by "Genre" as shown in FIG. 10. For each genre, data is assigned as its lower attribute. FIG. 11 shows an exemplary configuration of the data of lower attributes. In FIG. 11, personalitys "A", "B", "C", "D", "E", and so on and their degrees of importance are described along with data 141-1 about "Personality" as a lower attribute corresponding to "News" of the interest data shown in FIG. 10, for example. Likewise, there are lower attributes such as data 141-2 about "Broadcast Station", data about "Time Zone", and so on.

The degree of importance of each attribute is obtained by numerically expressing the frequency at which the attribute is extracted, for example. Also, attributes having higher degree of importance are preferred for contents recommendation. For example, when the contents associated with "News" is recommended, the content in which personality "A" performs is recommended preferentially.

It is possible to change the degree of importance of each attribute by the above-mentioned dialogue processing described with reference to FIG. 9. In this case, in step S43, dialogues such as "The news presented by personality C is the fixture on the news programs" and "Mr. C in the program X is the greatest", for example are displayed. In step S54, if "YES" is entered as the user response, then a predetermined value is added to the degree of importance of "C" in data 141-1 shown in FIG. 11 in step S55. On the other hand, if "NO" is entered as the user response in step S54, then in step S55, a predetermined value is subtracted from the degree of importance of "C" in data 141-1 shown in FIG. 11.

Also, in step S53, dialogue such as "When compared with B and C, we surely choose C", for example is displayed, thereby the degree of importance of comparison between B and C is made. In this case, if "YES" is entered as the user response in step S54, then the orders of B and C are reversed in data 141-1 shown in FIG. 11 in step S55. On the other hand, if "NO" is entered as the user response in step S54, data 141-1 shown in FIG. 11 are not changed in step S55.

As described above, for the associated information presented for contents recommendation, EPG and the metadata of contents are obtained by the associated-information database generation block 106 to be classified as the associated information corresponding to predetermined interest data and stored as a database. Some of this associated information include attributes which are not included in the interest data. For example, it is assumed that the content in which a new personality (for example, personality "F") performs is generated. The associated-information database generation block 106 acquires the metadata of this content and stores the associated information in the database, but there is no interest data about personality "F". In such a case, attribute addition processing is executed to add a new attribute to the interest data.

Figure 12:
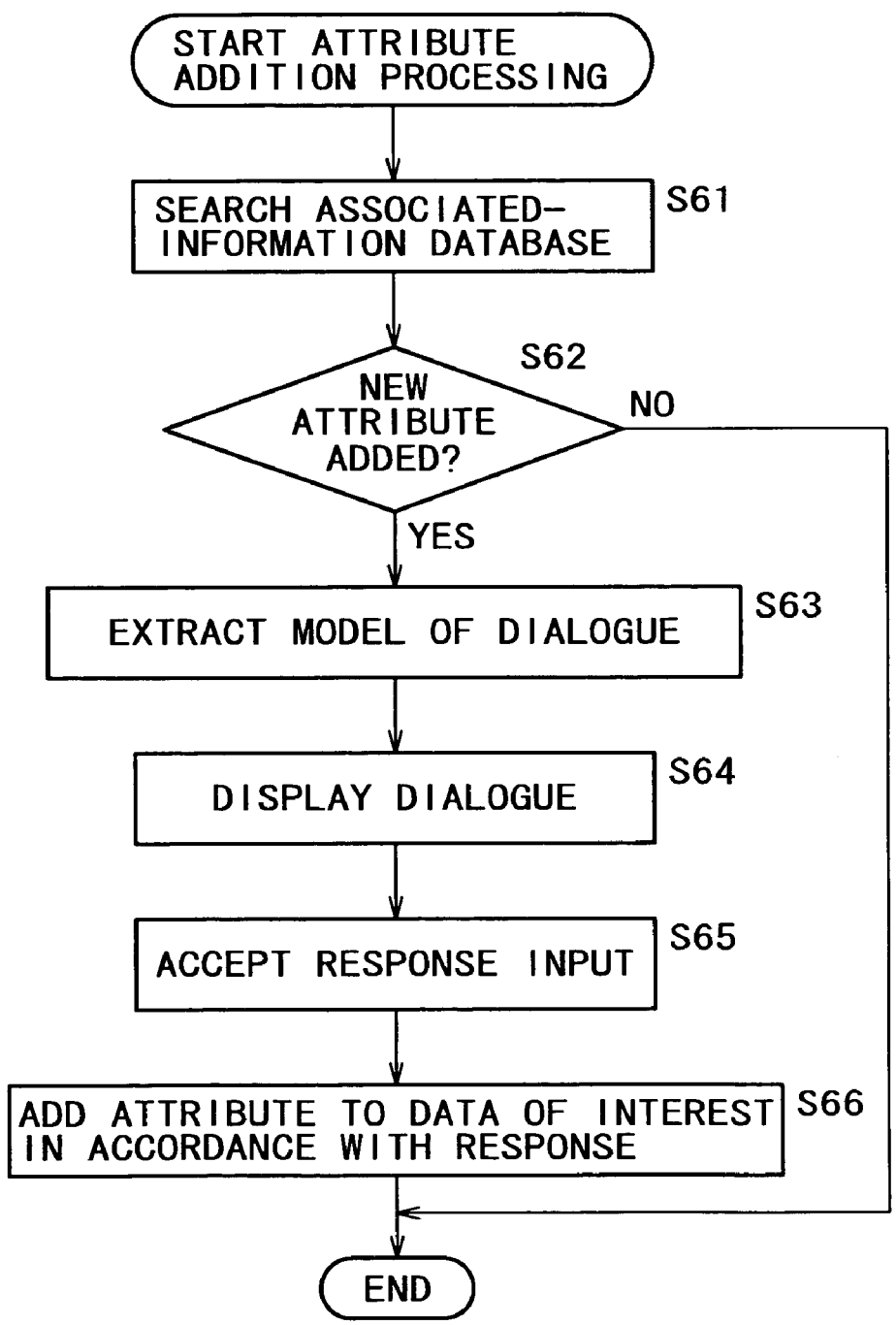
FIG. 12 is a flowchart describing attribute addition processing.

The following describes attribute update processing with reference to FIG. 12. In step S61, the topic selection block 124 searches the associated-information database. In step S62, the topic selection block 124 determines whether a new attribute has been added or not. If a new attribute is found added in step S62, then the dialogue generation block 121 extracts the model of dialogue from the dialogue database 125 in step S63.

In step S64, the dialogue generation block 121 makes the dialogue display block 122 display dialogues. At this time, a character string constituting a query is displayed on the monitor of the television receiver 3 as "Recently, F is very popular", for example. It is also practicable to display a character on the monitor of the television receiver 3 and make the character speak queries.

In step S65, the response input block 123 accepts the entry of the user response to the query displayed in step S43. The response is entered by operating the input block 76 by the user on the GUI for selecting a response (for example, "Interested", "Rather interested", or "Not interested" for example presented on the monitor of the television receiver 3. It is also practicable to enter a response by entering a character string by the user through the input block 76.

In step S66, the response input block 123 makes the interest extraction block 102 add a new attribute of interest data in accordance with the response. For example, if "Interested" is entered as the user response in step S65, the degree of importance of a predetermined value (for example, 10) is set in data 141-1 shown in FIG. 11, thereby adding personality "F". If "Rather interested" is entered as the user response in step S65, the value of the degree of importance is set to 5, adding personality "F". If "Not interested" is entered as the user response in step S65, the value of the degree of importance is set to 1, adding personality "F".

If no new attribute is added in step S62, the processes of steps S63 through S66 are skipped.

Thus, when a new attribute is added, the degree of importance of that attribute is set and added to the interest data.

In the above example, the interest data is changed on the basis of the interest data accumulated in the same device. It is also practicable the interest data may be changed on the basis of the interest data accumulated on different devices.

Figure 13:
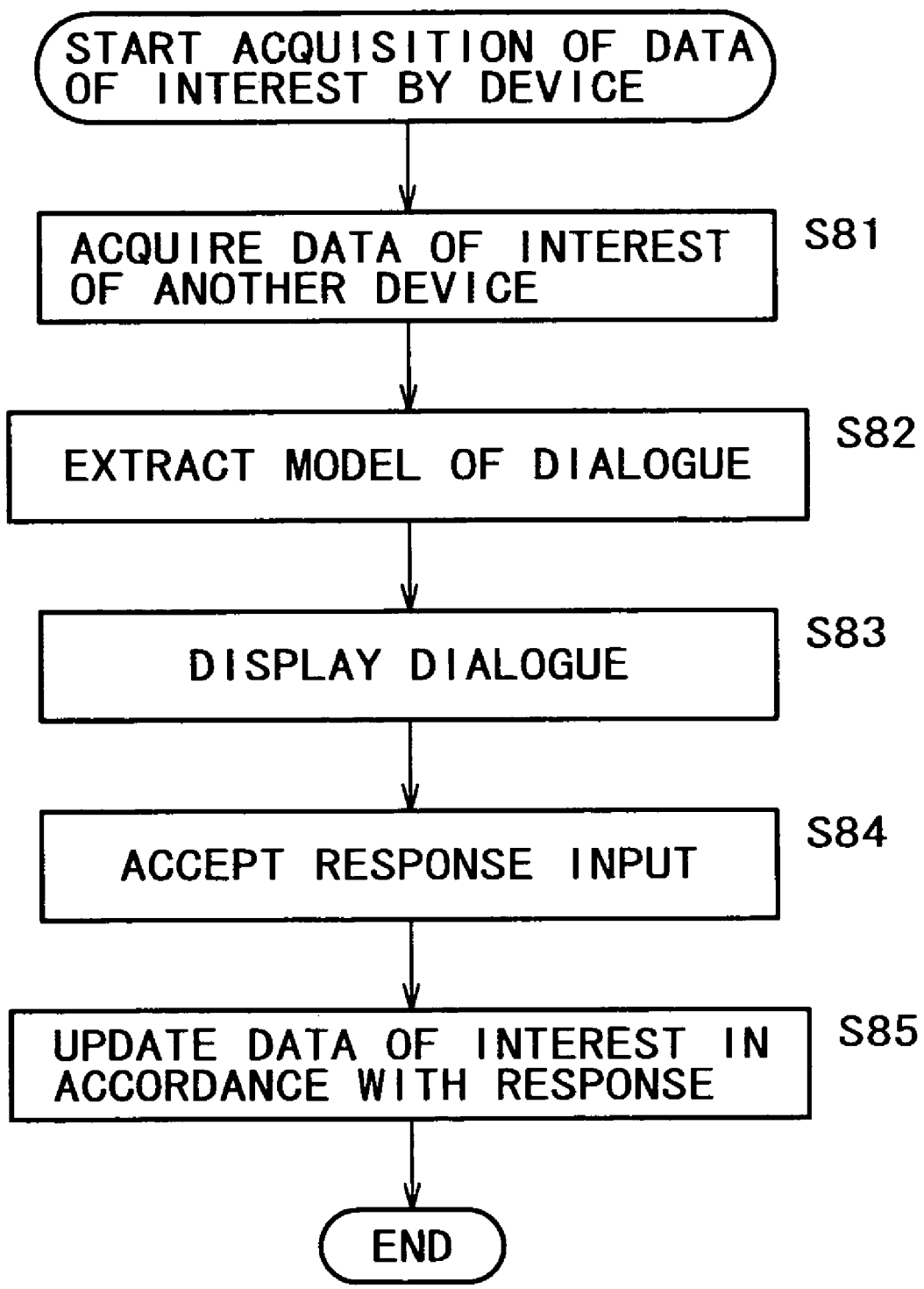
FIG. 13 is a flowchart describing the processing of acquiring interest data of another device.

The following describes the processing of acquiring interest data of another device with reference to FIG. 13. In what follows, an example is used in which the interest data accumulated on the HDD recorder 2-1 (device 1) is changed on the basis of the interest data accumulated on the personal computer 1 (device 2) which is another device.

In step S81, the interest extraction block 102 of device 1 acquires the interest data of another device (device 2). In step S82, the dialogue generation block 121 of device 1 extracts the model of dialogue from the dialogue database 125 and makes the dialogue display block 122 display the dialogue in step S83.

FIG. 14 is an example of dialogue displayed at this time. In this example, it is assumed that interest data 201 of device 1 or interest data 202 of device 2 be composed of keywords such as "Drama" and "Baseball" for example and the degree of importance of each keyword be set as numeric value. On the basis of keyword "Baseball" included in the interest data 202 of device 2, a display screen 221 is displayed on the display block of device 1 (for example, the monitor of the television receiver 3-1). In this example, below a character string "How about a baseball program for a change?" with "YES" button 241 and "NO" button 242 are displayed. On the basis of keyword "Hot spring" included in the interest data 202 of device 2, a display screen 222 of device 1 is displayed. In this example, below a character string "How about a hot spring program?" "YES" button 243 and "NO" button 244 are displayed.

Obviously, it is practicable to display dialogue on device 2 on the basis of the interest data of device 1. In this case, a display screen 223 is displayed on the display block of device 2 on the basis of the keyword "Drama" included in the interest data of device 1. In this example, a character string "How about web of drama?" is shown along with "YES" button 245 and "NO" button 246. Thus, dialogues to be displayed depend on the types of devices. For example, because the display screens 221 and 222 are displayed on the HDD recorder 2-1, a character string "Program" is used. On the other hand, the display screen 223 is displayed on the personal computer 1, so that a character string "Web" is used.

In step S85, the response input block 123 of device 1 makes the interest extraction block 102 change the degree of importance of interest data. For example, if "YES" is entered as the user response, namely "YES" button 241 is pressed on the display screen 221, in step S84, the degree of importance of the interest data of device 2 is added to the degree of importance of the interest data of the device 1. Therefore, the interest data 201 of the device 1 being changed to the interest data shown in FIG. 15A. In FIG. 15A, the value of the degree of importance of the keyword "Baseball" is changed to 13 (3+10).

If "NO" is entered as the user response, namely "NO" button 242 is pressed on the display screen 221 in step S84, the degree of importance of the interest data of device 1 is subtracted from the degree of importance of the interest data of device 2, interest data 201 of device 1 being changed to the interest data shown in FIG. 15B. In FIG. 15B, the value of the degree of importance of the keyword "Baseball" is changed to 0 (although 3−10=−7, 0 is set because 0 is the minimum value).

If the display screen 222 is displayed in step S83, then, if "YES" is entered as the user response in step S84, namely "YES" button 243 is pressed on the display screen 222, then the interest data 201 of the device 1 are changed to the interest data shown in FIG. 16. In FIG. 16, the keyword "Hot Spring" is added and the value of its degree of importance is set to 3.

Thus, the interest data is updated on the basis of the interest data from another device. This allows the wide collection of user preference information to generate interest data, thereby providing contents recommendations suited for user's preference.

The above-mentioned sequence of processes may be executed by hardware as well as software.

When the above-mentioned sequence of processing operations is executed by software, the programs constituting the software are installed in a computer which is built in dedicated hardware equipment or installed, from a network or recording media which is loaded into the drive 61 in FIG. 2, into a general-purpose personal computer for example in which various programs may be installed for the execution of various functions.

It should be noted herein that the steps for describing each program recorded in recording media include not only the processing operations which are sequentially executed in a time-series manner but also the processing operations which are executed concurrently or discretely.

As described and according to the invention, contents can be provided for the user. Especially, the present invention allows the proper reflection of the change in user's preference and the proper inference of user's interest for newly added attributes, thereby providing contents recommendation which is close to user's interest.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus comprising:
   extraction means for extracting interest data having a plurality of attributes indicative of a user's interest, an extracted interest data having first and second interest data;
   comparison means for comparing a predicted degree of importance of the extracted interest data against a predetermined threshold, the second interest data having a predicted degree of importance lower than the predetermined threshold and corresponding to interest data which is expected not to interest the user, the first interest data having a predicted degree of importance higher than the predetermined threshold and corresponding to interest data which is expected to interest the user;
   selection means for selecting only the second interest data having a predicted degree of importance lower than the predetermined threshold from among said extracted interest data extracted by said extraction means;
   presentation means for presenting only said second interest data selected by said selection means which has a predicted degree of importance lower than the predetermined threshold;
   dialogue means for receiving a response indicative of an actual degree of importance to the user of said second interest data presented by said presentation means which has a predicted degree of importance lower than the predetermined threshold; and update means for updating said first and second interest data on the basis of a result of the response received by said dialogue means, wherein said update means changes an order of said predicted degree of importance on basis of a result of said response received by said dialogue means.

2. The information processing apparatus according to claim 1, wherein said dialogue means comprises:

generation means for generating a query on the basis of a model of dialogue; and response input means for receiving a user response for the presented query generated by said generation means and presented to said user, wherein said extraction means changes said first and second interest data on the basis of said response received by said response input means.

3. The information processing apparatus according to claim 2, further comprising:

database production means for producing a database of associated information about contents to be recommended to said user by obtaining metadata of said contents;

wherein said selection means selects said interest data from said database of said associated information.

4. The information processing apparatus according to claim 2, wherein said generation means selects said model of dialogue in accordance with a characteristic of said information processing apparatus.

5. The information processing apparatus according to claim 1, wherein said extraction means extracts interest data of another information processing apparatus and said selection means selects said second interest data from among said interest data of said another information processing apparatus extracted by said extraction means.

6. The information processing apparatus according to claim 1, wherein said interest data have a plurality of attributes and said extraction means extracts said interest data on the basis of a degree of importance of each of said plurality of attributes.

7. The information processing apparatus according to claim 6, wherein said update means adds a predetermined value to or subtracts a predetermined value from said degree of importance on the basis of a result of said response received by said dialogue means.

8. The information processing apparatus according to claim 6, wherein said update means changes an order of said degree of importance on the basis of a result of said response received by said dialogue means.

9. The information processing apparatus according to claim 6, wherein said update means deletes or adds said interest data on the basis of a result of said response received by said dialogue means.

10. The information processing apparatus according to claim 6, wherein said update means executes addition or subtraction between said degree of importance and a degree of importance of said interest data extracted from said another information processing apparatus on the basis of a result of said response received by said dialogue means.

11. An information processing method comprising the steps of:

extracting interest data having a plurality of attributes indicative of user's interest, an extracted interest data having first and second interest data;

comparing a predicted degree of importance of the extracted interest data against a predetermined threshold, the second interest data having a predicted degree of importance lower than the predetermined threshold and corresponding to interest data which is expected not to interest the user, the first interest data having a predicted degree of importance higher than the predetermined threshold and corresponding to interest data which is expected to interest the user;

selecting only the second interest data having a predicted degree of importance lower than the predetermined threshold from among said extracted interest data extracted by said extraction step;

presenting only said second interest data selected by said selection step which has a predicted degree of importance lower than the predetermined threshold;

receiving a response indicative of an actual degree of importance to the user of said second interest data presented by said presentation step which has a predicted degree of importance lower than the predetermined threshold;

updating said first and second interest data on the basis of a result of the response received by said receiving step; and changing an order of said predicted degree of importance on basis of a result of said response received by said receiving step.

12. A computer readable recording medium including a program for causing a computer execute a method, the method comprising the steps of:

controlling extraction of interest data having a plurality of attributes indicative of user's interest, an extracted interest data having first and second interest data;

comparing a predicted degree of importance of the extracted interest data against a predetermined threshold, the second interest data having a predicted degree of importance lower than the predetermined threshold and corresponding to interest data which is expected not to interest the user, the first interest data having a predicted degree of importance higher than the predetermined threshold and corresponding to interest data which is expected to interest the user;

controlling selection so as to select only the second interest data having a predicted degree of importance lower than the predetermined threshold from among said extracted interest data extracted by said extraction controlling step;

controlling presentation so as to present only said second interest data selected by said selection controlling step which has a predicted degree of importance lower than the predetermined threshold;

controlling dialogue to receive a response indicative of an actual degree of importance to the user of said second interest data presented by said presentation controlling step which has a predicted degree of importance lower than the predetermined threshold; and controlling updating said first and second interest data on the basis of a result of the response received by said dialogue step; and controlling changing an order of said predicted degree of importance on basis of a result of said response received by said dialogue step.

13. An information processing apparatus comprising:

extraction unit configured to extract interest data having a plurality of attributes indicative of a user's interest, an extracted interest data having first and second interest data;

comparison unit configured to compare a predicted degree of importance of the extracted interest data against a predetermined threshold, the second interest data having a predicted degree of importance lower than the predetermined threshold and corresponding to interest data which is expected not to interest the user, the first interest data having a predicted degree of importance higher than the predetermined threshold and corresponding to interest data which is expected to interest the user;

selection unit configured to select only the second interest data having a predicted degree of importance lower than the predetermined threshold from among said extracted interest data extracted by said extraction unit;

presentation unit configured to present only said second interest data selected by said selection unit which has a predicted degree of importance lower than the predetermined threshold;

dialogue unit configured to receive a response indicative of an actual degree of importance to the user of said second interest data presented by said presentation unit which has a predicted degree of importance lower than the predetermined threshold; and update unit configured to update said first and second interest data on the basis of a result of the response received by said dialogue unit, wherein said update unit changes an order of said predicted degree of importance on basis of a result of said response received by said dialogue unit.

* * * * *